US009440548B2

(12) United States Patent
Raskar

(10) Patent No.: US 9,440,548 B2
(45) Date of Patent: Sep. 13, 2016

(54) METHOD AND SYSTEM FOR MANAGING AND CONTROLLING ELECTRICAL VEHICLE CHARGING EVENTS

(71) Applicant: Cognizant Technology Solutions India Pvt. Ltd., Chennai (IN)

(72) Inventor: Hemant Babanrao Raskar, Pune (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 507 days.

(21) Appl. No.: 13/628,610

(22) Filed: Sep. 27, 2012

(65) Prior Publication Data

US 2014/0046499 A1    Feb. 13, 2014

(30) Foreign Application Priority Data

Aug. 8, 2012   (IN) .......................... 3260/CHE/2012

(51) Int. Cl.
  *G06F 1/26*   (2006.01)
  *B60L 11/18*  (2006.01)
  *H04L 29/08*  (2006.01)

(52) U.S. Cl.
  CPC ........ *B60L 11/1846* (2013.01); *B60L 11/1848* (2013.01); *B60L 11/1851* (2013.01); *H04L 67/30* (2013.01); *B60L 2230/16* (2013.01); *B60L 2230/40* (2013.01); *B60L 2240/70* (2013.01); *B60L 2240/80* (2013.01); *Y02T 10/705* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
  USPC ........................................................ 700/297
  See application file for complete search history.

(56) References Cited

U.S. PATENT DOCUMENTS

| 7,747,739 | B2 * | 6/2010 | Bridges ..................... B60L 3/12 307/80 |
| 7,991,665 | B2 | 8/2011 | Hafner et al. |
| 8,013,570 | B2 | 9/2011 | Baxter et al. |
| 8,143,842 | B2 | 3/2012 | Tyler et al. |
| 2009/0174365 | A1 | 7/2009 | Lowenthal et al. |
| 2009/0313033 | A1 | 12/2009 | Hafner et al. |
| 2009/0313098 | A1 | 12/2009 | Hafner et al. |
| 2010/0049610 | A1 | 2/2010 | Ambrosio et al. |
| 2010/0114798 | A1 | 5/2010 | Sirton |
| 2010/0211340 | A1 | 8/2010 | Lowenthal et al. |

(Continued)

*Primary Examiner* — Carlos Ortiz Rodriguez
(74) *Attorney, Agent, or Firm* — Lerner, David, Littenberg, Krumholz & Mentlik, LLP

(57) ABSTRACT

A system and method for managing and controlling charging of electric vehicles via charging stations over an advanced metering infrastructure is provided. Smart meters are deployed in the charging stations. Electric vehicle clusters which are logical representations of at least the charging stations are created. Policies for controlling electric vehicle charging based on data obtained using the electric vehicle clusters are generated. Further, it is analyzed if meter data obtained from the smart meters using the electric vehicle clusters comply with the generated policies. The meter data is obtained using the electric vehicle clusters identified with electric vehicle charging events. Policy violation action data is generated by applying predetermined rules if it is determined that the policies are violated. The policy violation action data is then sent to the identified electric vehicle clusters for controlling electric vehicle charging.

19 Claims, 10 Drawing Sheets

(56) References Cited

U.S. PATENT DOCUMENTS

2011/0133693 A1 6/2011 Lowenthal et al.
2012/0123806 A1* 5/2012 Schumann et al. ............... 705/4
2012/0277927 A1* 11/2012 Watkins et al. ............... 700/292

* cited by examiner

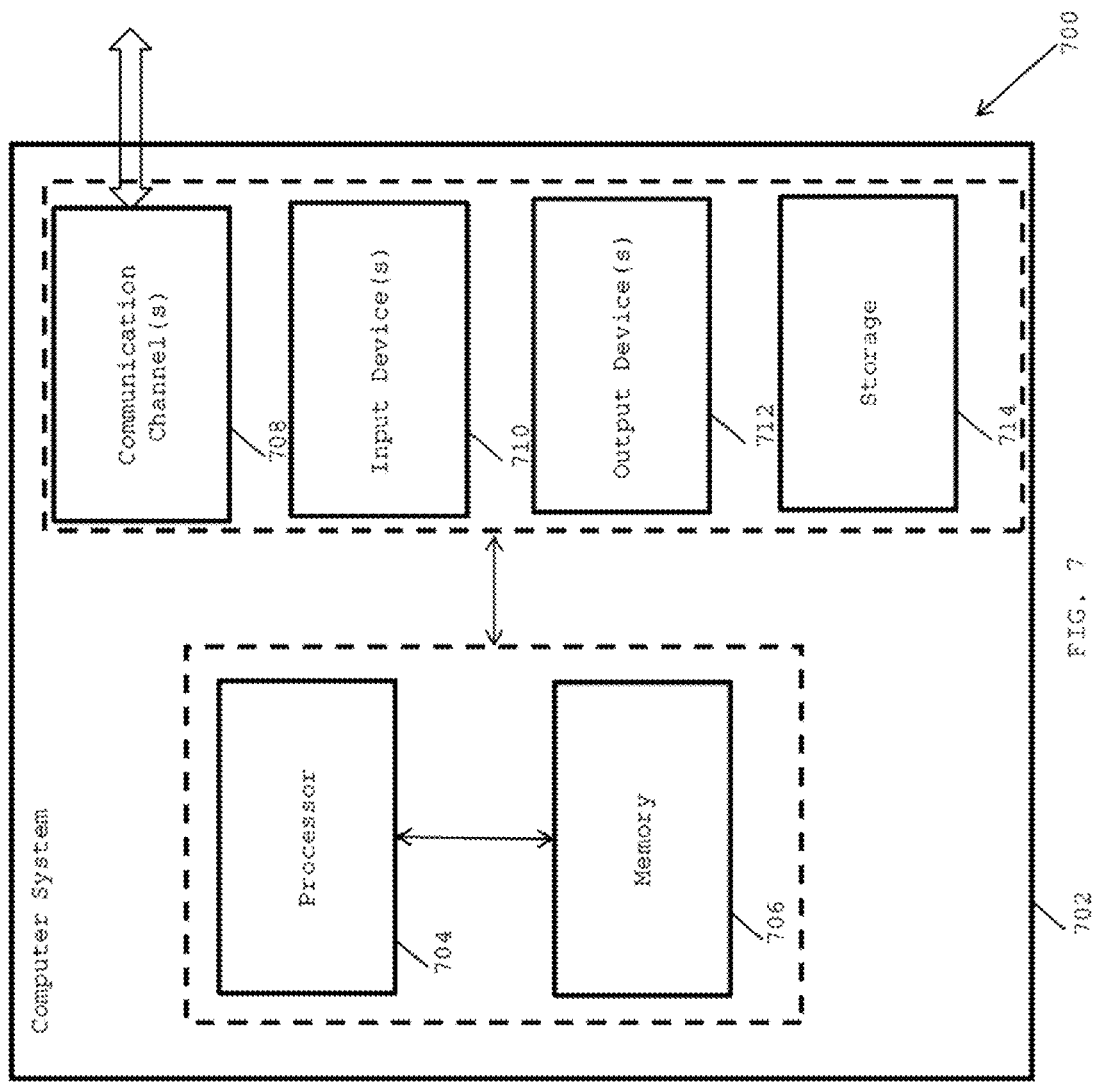

METHOD AND SYSTEM FOR MANAGING AND CONTROLLING ELECTRICAL VEHICLE CHARGING EVENTS

FIELD OF THE INVENTION

The present invention relates generally to the field of data processing in electric vehicle charging systems and more specifically to a method and system for managing and controlling electrical vehicle charging events.

BACKGROUND OF THE INVENTION

An electric vehicle may refer to a vehicle that draws electrical energy from an external power source such as an electric power grid of an electric utility for its charging. An electric utility is a power source that involves generation, transmission, and distribution of electricity for public consumption. Nowadays, due to increase in the number of electric vehicles and frequent charging requirements of the electric vehicles, electric utilities anticipate major challenges such as high concentration of electric vehicle charging events in a given geographic area causing power shortage or power grid instability due to uncontrolled electric vehicle charging events, peak-load shifting, increased peak-load during day-time caused due to additional high load-requirements for electric vehicle charging, increase in night-time load for residential use thereby degrading life-time for power-resources, advanced techniques for efficient load-valley filling etc. Consequently, there is a need for minimizing the impact of electric vehicle charging on the grid and power supplies using better utilization of available power. Further, large number of electric vehicle charging stations and their scattered distribution poses difficulty in assessing power consumption requirements for efficient distribution of electric power. For example, high concentration of charging stations in certain geographic areas may lead to over utilization of power grid resources. Furthermore, charging of electric vehicles in an uncontrolled fashion leads to power grid overloading which may in turn lead to power failure and unequal distribution of electricity for consumption.

In light of the abovementioned disadvantages, there is a need for a method and system for controlling and managing electric vehicle charging by efficiently utilizing available power capacity. Also, there is a need for a method and system for efficiently organizing large and distributed electric vehicle charging stations to facilitate centralized control of electric vehicle charging. In addition, there is a need of a method and system for preventing and monitoring uncontrolled electric vehicle charging events at the charging stations.

SUMMARY OF THE INVENTION

A system for managing and controlling charging of electric vehicles via one or more charging stations over an advanced metering infrastructure is provided. One or more smart meters are deployed in the one or more charging stations. The system comprises an electric vehicle cluster unit in communication with a processor and configured to create one or more electric vehicle clusters. The one or more electric vehicle clusters are logical representations of at least the one or more charging stations in one or more distribution circuit areas. Further, the system comprises a smart meter management unit in communication with the processor and configured to generate one or more policies for controlling electric vehicle charging based on data obtained using the one or more electric vehicle clusters. Further, the smart meter management unit is configured to analyze if meter data obtained from the one or more smart meters using the one or more electric vehicle clusters is in compliance with the generated one or more policies. The meter data is obtained using the one or more electric vehicle clusters identified with one or more electric vehicle charging events. Furthermore, the smart meter management unit is configured to generate one or more policy violation action data by applying one or more predetermined rules if it is determined that the one or more policies are violated. The smart meter management unit is further configured to send the policy violation action data to the one or more smart meters via the identified one or more electric vehicle clusters for controlling electric vehicle charging.

A computer-implemented method for managing and controlling charging of electric vehicles via one or more charging stations over an advanced metering infrastructure is provided. One or more smart meters are deployed in the one or more charging stations. The method comprises generating, via a processor, one or more policies for controlling electric vehicle charging events. The one or more policies are generated based on data obtained using the one or more electric vehicle clusters. The one or more electric vehicle clusters are logical representations of at least the one or more charging stations. The method further comprises monitoring, via the processor, the one or more electric vehicle clusters for a predefined time interval for identifying uncontrolled electric vehicle charging events. Further, the method comprises receiving, via the processor, meter data from the one or more smart meters of the identified one or more electric vehicle clusters. Furthermore, the method comprises analyzing, via the processor, the received meter data to determine if the one or more policies are violated. The method further comprises generating, via the processor, one or more policy violation action data by applying one or more predetermined rules based on the analysis. Further, the method comprises sending, via the processor, the one or more policy violation data to the one or more smart meters via the identified one or more electric vehicle clusters for controlling the electric vehicle charging.

A computer program product comprising a non-transitory computer-readable medium having computer-readable program code stored thereon is provided. The computer-readable program code comprises instructions that, when executed by a processor, cause the processor to generate one or more policies for controlling electric vehicle charging events. The one or more policies are generated based on data obtained using the one or more electric vehicle clusters. Further, the one or more electric vehicle clusters are logical representations of at least the one or more charging stations. The computer-readable program code further comprises instructions that, when executed by the processor, cause the processor to monitor the one or more electric vehicle clusters for a predefined time interval for identifying uncontrolled electric vehicle charging events. Further, the computer-readable program code comprises instructions that, when executed by the processor, cause the processor to receive meter data from the one or more smart meters of the identified one or more electric vehicle clusters. Furthermore, the computer-readable program code comprises instructions that, when executed by the processor, cause the processor to analyze the received meter data to determine if the one or more policies are violated. The computer-readable program code comprises instructions that, when executed by the processor, cause the processor to generate one or more policy violation action data by applying one or more predetermined rules based on the analysis. Furthermore, the computer-readable program code comprises instructions that, when executed by the processor, cause the processor to send the one or more policy violation data to the one or more smart meters using the identified one or more electric vehicle clusters for controlling the electric vehicle charging.

BRIEF DESCRIPTION OF THE ACCOMPANYING DRAWINGS

The present invention is described by way of embodiments illustrated in the accompanying drawings wherein:

FIG. 7 illustrates an exemplary computer system in which various embodiments of the present invention may be implemented.

DETAILED DESCRIPTION OF THE INVENTION

A system, method and computer-program product is provided for managing and controlling electric vehicle charging events. The invention provides for creating electric vehicle clusters for organizing a large number of distributed charging stations. Further, the invention provides for managing and controlling electric vehicle charging events at the charging stations via the electric vehicle clusters to prevent uncontrolled electric vehicle charging events.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
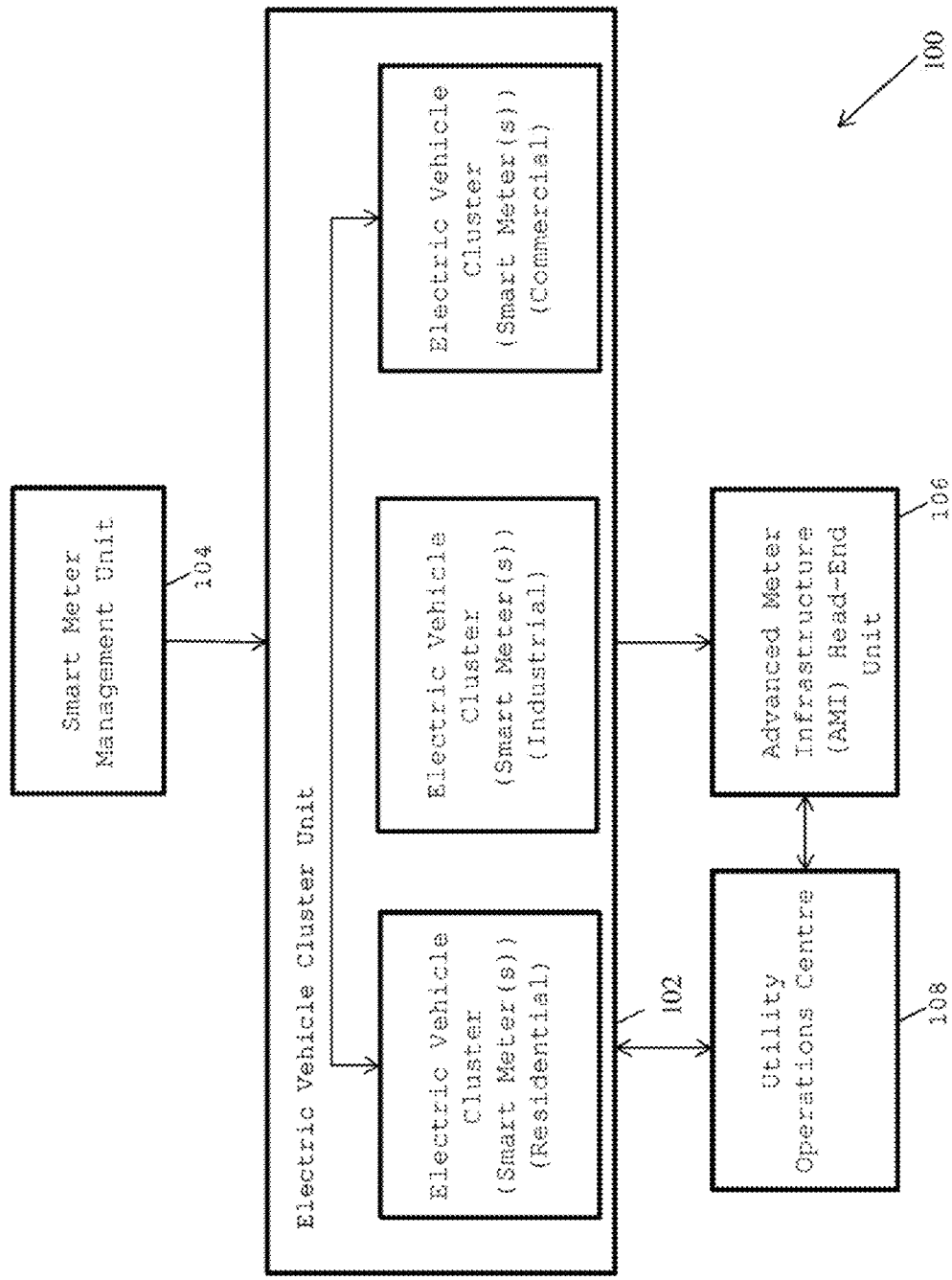
FIG. 1 is a block diagram of a system for managing and controlling electric vehicle charging events.

FIG. 1 is a block diagram of a system 100 for managing and controlling electric vehicle charging events, in accordance with an embodiment of the present invention. In various embodiments of the present invention, the system comprises an electric vehicle cluster unit 102, a smart meter management unit 104, an Advanced Meter Infrastructure (AMI) head-end unit 106 and a utility operations centre 108.

The electric vehicle cluster unit 102 is a module configured to create one or more electric vehicle clusters. The electric vehicle clusters are logical representations of electric vehicle charging stations (not shown). The electric vehicle charging stations (not shown) are typically deployed at various residential, commercial and industrial locations, and are served by respective substations. Substations are owned and operated by an electric utility for supplying electricity for consumption. In an embodiment of the present invention, the created one or more electric vehicle clusters reside in the electric vehicle unit 102, and correspond to the actual charging stations in respective distribution circuit areas. In an embodiment of the present invention, a first set of electric vehicle clusters may include residential electric vehicle clusters representing the charging stations at residential locations, a second set of electric vehicle clusters may include commercial electric vehicle clusters representing charging stations at industrial locations, and a third set of electric vehicle clusters may include commercial electric vehicle clusters representing charging stations at commercial locations.

Each of the actual electric vehicle charging stations (not shown) has one or more smart meters which are electronic meters that record electricity consumption, load and other metering data. In an embodiment of the present invention, the one or more smart meters communicate the recorded information to the utility operations center 108 via the AMI head-end unit 106 in predetermined periodic time intervals. In another embodiment of the present invention, the one or more smart meters communicate the recorded information in response to on-demand smart meter read-requests. The AMI head-end unit 106 is a communication gateway between the electric vehicle cluster unit 102 and the actual smart meters deployed at charging stations (not shown), and facilitate exchanging data between the electric vehicle cluster unit 102 and the actual smart meters. As discussed previously, the utility operations centre 108 retrieves the recorded information of the actual smart meters via the AMI head-end unit 106 on a real time basis, and updates the electric vehicle cluster unit 102. In an embodiment of the present invention, the utility operations centre 108 is operated by human operators. In another embodiment of the present invention, the utility operations centre 108 is operated by electronic systems. Wireless and/or wired communication channels facilitate a two way communication between the actual smart meters (not shown), the AMI head-end unit 106 and the utility operations centre 108.

The electric vehicle cluster unit 102 is thus updated with real time information of an electric vehicle charging event that occur in corresponding actual charging stations (not shown). In various embodiment of the present invention, the electric vehicle charging cluster unit 102 forms a centralized unit using which electric vehicle charging events at various actual charging stations (not shown) in widely distributed locations can be monitored, managed and controlled (This aspect of the invention has been described in later sections of the specification).

In an embodiment of the present invention, the electric vehicle cluster unit 102 creates the electric vehicle clusters as virtual objects using geo-location information associated with charging stations. The virtual objects are software representations of actual charging stations and associated geographical locations. In an exemplary embodiment of the present invention, programming languages such as .Net may be used to create the virtual objects. In an exemplary embodiment of the present invention, the electric vehicle clusters are represented as polygon shaped entities, and the vertices of the polygons represent an actual set of geographic longitude and latitude of predetermined locations. In an embodiment of the present invention, the predetermined locations include location of actual charging stations. In another embodiment of the present invention, the predetermined locations include substation area of the actual charging stations. In yet another embodiment of the present invention, the predetermined locations may include areas defined by zip code associated with the actual charging stations.

Figure 1A:
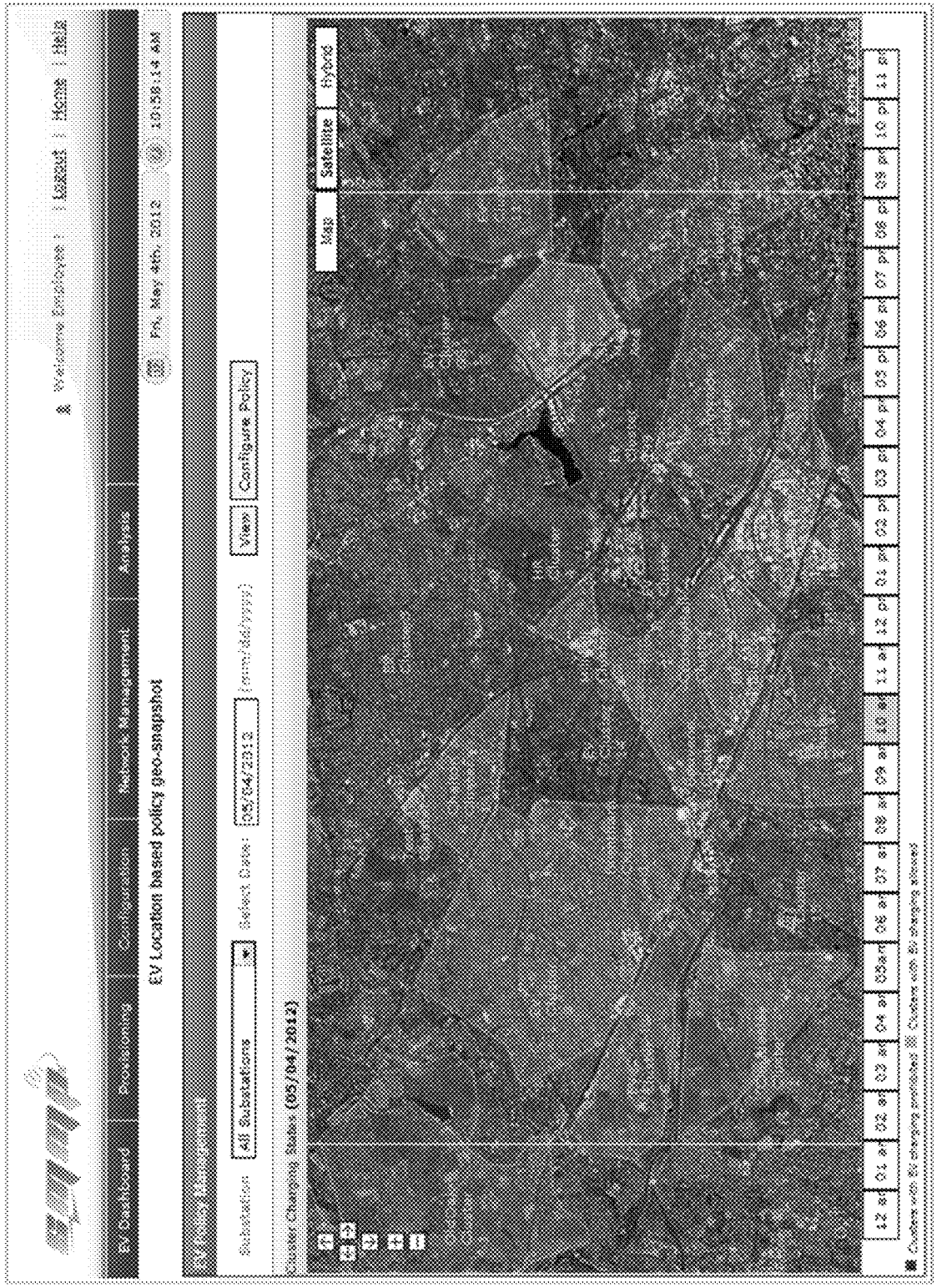
FIG. 1A is an exemplary screenshot of electric vehicle clusters, in accordance with an embodiment of the present invention.

FIG. 1A is an exemplary screenshot depicting the polygon shaped electric vehicle clusters. The edges of an electric vehicle cluster may overlap with edges of one or more electric vehicle clusters. In an exemplary embodiment of the present invention, the electric vehicle cluster unit 102 creates the electric vehicle clusters using various maps. The methodology may include, firstly, displaying a Geographic Information System (GIS) map or a satellite map in an application page. Secondly, using a map-draw mode, polygon edges are drawn on the satellite map representing actual boundaries of geographic areas for which electric clusters are required to be created. Then, first and last vertices of polygons are matched in order to complete the polygons. The boundaries of polygon are editable and the polygons can be of any shape and size with any number of vertices and edges. The polygons are then finalized in order to complete electric vehicle cluster provisioning with finite geographic boundaries.

In another exemplary embodiment of the present invention, the created electric vehicle clusters are configured using one or more attributes, which may be defined by the electric utility based on its business requirements. The attributes include, but are not limited to, cluster name (for example—electric vehicle cluster-1, electric vehicle cluster-2), cluster type (for example—residential, commercial or industrial), number of electric vehicle charging stations, geographic boundaries of the charging stations (for example, set of latitudes and longitudes), geographic boundaries of substation area associated with the actual charging stations, geographic boundaries of areas defined by zip code associated with the actual charging stations, and geographic distribution circuit area. Therefore, each electric vehicle cluster has one or more attributes assigned thereto which in turn forms the electric vehicle cluster data.

Referring to FIG. 1, the smart meter management unit 104 is configured to manage and control electric vehicle charging events of the one or more actual charging stations (not shown) via corresponding electric vehicle clusters in the electric vehicle cluster unit 102. In an embodiment of the present invention, the smart meter management unit 104 generates and configures a set of policies which are used to manage and control electric vehicle charging events of the one or more actual charging stations (not shown). The smart meter management unit 104 generates and configures a set of policies using the cluster data from the electric vehicle cluster unit 102. Further, the smart meter management unit 104 generates and configures a set of policies using substation data from the electric vehicle cluster unit 102. The set of policies and policy configuration will be explained in detail with respect to FIG. 2.

The smart meter management unit 104 is further configured to enforce the generated set of policies on the one or more smart meters deployed at the charging stations via the electric vehicle cluster unit 102. The policies are enforced by defining charging profiles of the one or more smart meters. Once the charging profile is defined, the one or more smart meters are programmed to generate meter data which is relevant to the policies. The smart meter management unit 104 monitors the one or more smart meters via the electric vehicle cluster unit 102 to identify one or more electric vehicle charging events. In response to electric vehicle charging events, the smart meter management unit 104 obtains meter data from the identified one or more smart meters and checks for any policy violation. In case of policy violation, the smart meter management unit 104 applies one or more predetermined rules to generate a set of policy violation action data. The one or more predetermined rules and policy violation action data are explained in detail with respect to FIG. 2. The smart meter management unit 104 then sends the policy violation action data to the one or more smart meters or to the electric vehicle owners for controlling the electric vehicle charging event or stopping the electric vehicle charging event.

Figure 2:
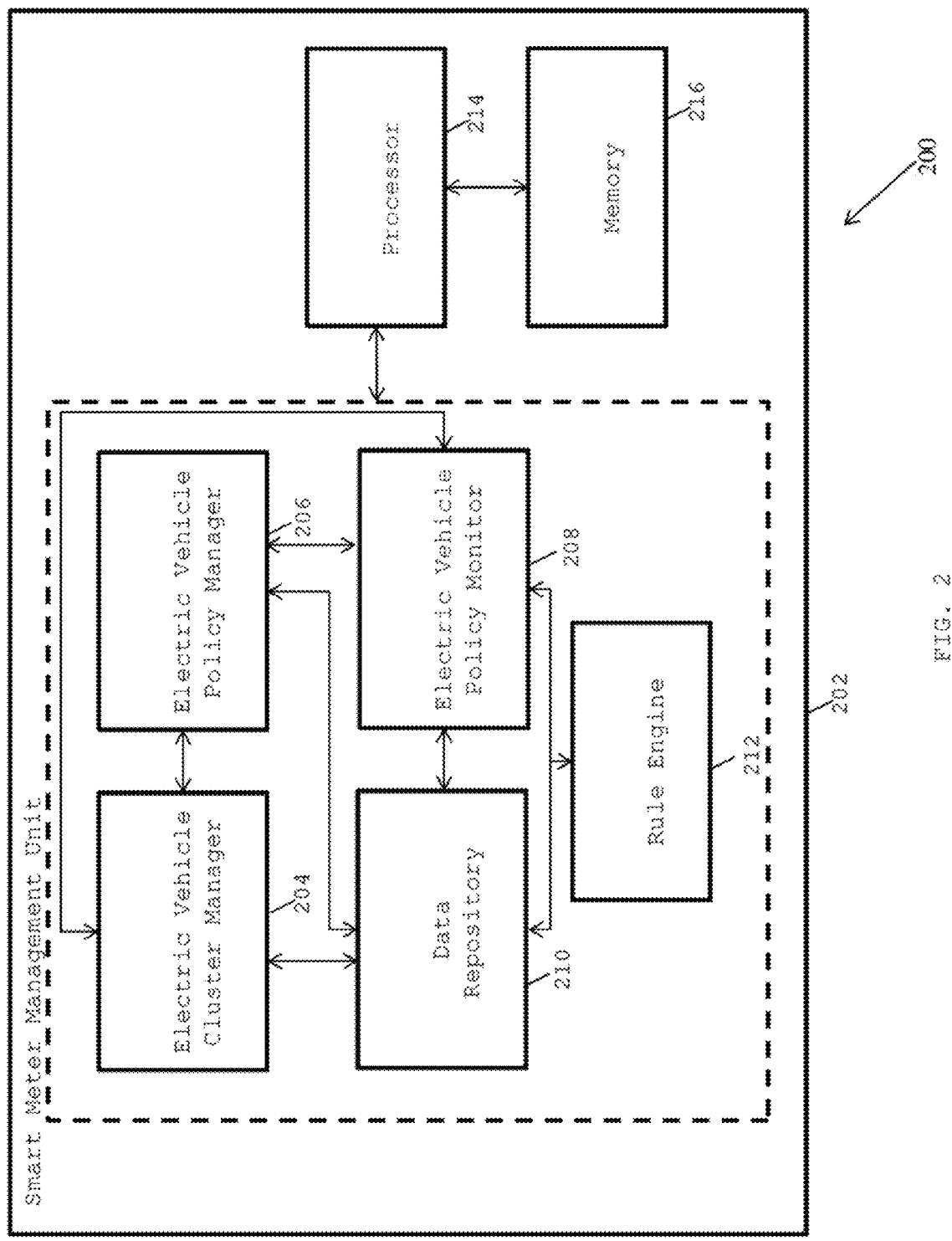
FIG. 2 is a block diagram of a smart meter management unit, in accordance with an embodiment of the present invention.

FIG. 2 is a block diagram of a smart meter management unit 202, in accordance with an embodiment of the present invention. In various embodiments of the present invention, the smart meter management unit 202 comprises an electric vehicle cluster manager 204, an electric vehicle policy manager 206, an electric vehicle policy monitor 208, a data repository 210 and a rule engine 212. The electric vehicle cluster manager 204, electric vehicle policy manager 206, electric vehicle policy monitor 208, data repository 210 and the rule engine 212 operate in communication with a processor 214 and a memory 216.

The electric vehicle cluster manager 204 is configured to communicate with one or more electric vehicle clusters of the electric vehicle cluster unit 102 (FIG. 1) for exchanging data which is required for managing and controlling the electric vehicle clusters. As discussed in conjunction with FIG. 1, the one or more electric vehicle clusters represent a set of charging stations where one or more smart meters are deployed.

In an embodiment of the present invention, the electric vehicle cluster manager 204 collects electric vehicle cluster data from the electric vehicle cluster unit 102 (FIG. 1) and stores the collected cluster data in the data repository 210. As discussed in conjunction with FIG. 1, in an exemplary embodiment of the present invention, the electric vehicle cluster data includes, but are not limited to, cluster name (for example—electric vehicle cluster-1), cluster type (for example—residential, commercial or industrial), and number of electric vehicle charging stations, geographic boundaries of the charging stations (for example, set of latitudes and longitudes), charging-load threshold and geographic distribution circuit area.

In another embodiment of the present invention, the electric vehicle cluster manager 204 collects substation data from the electric vehicle cluster unit 102 (FIG. 1) and stores the collected substation data in the data repository 210. In an exemplary embodiment of the present invention, the substation data includes, but are not limited to, off-peak load conditions, on-peak load conditions, and load based threshold data that are obtained from an electric utility for particular calendar days, time and geographic area. The electric vehicle cluster manager 204 is in communication with the processor 214 which executes a set of program instructions, stored in the memory 216, to execute the functionalities of the electric vehicle cluster manager 204.

In an embodiment of the present invention, the electric vehicle policy manager 206 is configured to generate and configure one or more policies related to controlling electric vehicle charging events using the cluster data and the substation data. As discussed previously, the cluster data defines the attributes of the electric vehicle clusters, and the substation data provides electric utility projected load data based on various factors such peak electricity consumption time, calendar day, geographic area etc. In another embodiment of the present invention, the electric vehicle policy manager 206 is configured to generate and configure one or more policies related to controlling electric vehicle charging events using user provisioned data which is stored in the data repository 210. The user provisioned data may include charging load threshold data based on particular time, calendar day and geographic area.

In an embodiment of the present invention, the electric vehicle policy manager 206 retrieves the cluster data, the substation data and user provisioned data from the data repository 210 and generates the electric vehicle policy configuration data. In an exemplary embodiment of the present invention, the policy configuration data may include, but are not limited to, electric utility projected off-peak or on-peak load condition for particular calendar days and time, electric utility projected off-peak or on-peak load condition for a particular distribution circuit area, electric utility projected allow or deny conditions for electric vehicle charging, and a load threshold data which is obtained based on electric utility projected total aggregated electric vehicle charging load at a particular time for a particular distribution circuit area. The electric vehicle policy manager 206 stores the generated electric vehicle policy configuration data in the data repository 210.

In another embodiment of the present invention, the electric vehicle policy manager 206 retrieves the electric vehicle charging policy configuration data from the data repository 210 and configures one or more electric vehicle charging policies based on the retrieved data. The electric vehicle charging policies are a set of conditions which are defined for preventing uncontrolled electric vehicle charging events in a particular geographic area. In an exemplary embodiment of the present invention, the electric vehicle charging policies include timestamp based electric vehicle charging policy (Pt). The timestamp based electric vehicle charging policy (Pt) is configured using policy configuration data based on electric utility projected off-peak or on-peak load condition for particular calendar days and time. In another exemplary embodiment of the present invention, the electric vehicle charging policies include geographic location based electric vehicle charging policy (Pl). The geographic location based electric vehicle charging policy (Pl) is configured using policy configuration data based on electric utility projected allow or deny conditions for electric vehicle charging. In yet another exemplary embodiment of the present invention, the electric vehicle charging policies include electric vehicle load threshold based electric vehicle charging policy (Pd). The electric vehicle load threshold based electric vehicle charging policy (Pd) is configured using policy configuration data based on load threshold for a particular distribution circuit area associated with electric vehicle clusters.

In an embodiment of the present invention, the electric vehicle policy manager 206 configures the policies Pt, Pd and Pl using one or more configuration attributes which are defined by the electric utility based on its business requirements. The one or more configuration attributes include, but are not limited to, policy name (for example, policy 1, policy 2), policy type (for example, Pt, Pd or Pl), policy category (for example, commercial or residential or industrial), electric vehicle cluster (for example, electric vehicle cluster 1 or electric vehicle cluster 2), substation (substation 1 or substation 2), policy start time, policy end time, electric vehicle charger level (for example, level 1 or level 2), and electric vehicle charging load threshold (LT).

In an embodiment of the present invention, the electric vehicle policy manager 206 enforces the policies (e.g. Pt, Pd, Pl) on the one or more smart meters based on one or more parameters. The electric vehicle policy manager 206 obtains the one or more parameters from the electric vehicle cluster unit 102 (FIG. 1) via the electric vehicle cluster manager 204. In an exemplary embodiment of the present invention, the one or more parameters include, but are not limited to, type of electric vehicle cluster, type of electric vehicle charger, calendar day and time zone related to the electric vehicle charging event and whether electric vehicle charging is allowed or not. Based on an analysis of the above mentioned parameters, the electric vehicle policy manager 206 enforces the timestamp based electric vehicle charging policy (Pt). In another exemplary embodiment of the present invention, the electric vehicle policy manager 206 analyses one or more parameters including, but not limited to, electric vehicle cluster, calendar day and time zone for which electric vehicle charging is either allowed or denied, and distribution circuit area related to an electric vehicle charging event. Based on an analysis of the above mentioned parameters, the electric vehicle policy manager 206 enforces the geographic location based electric vehicle charging policy (Pl). In yet another exemplary embodiment of the present invention, the electric vehicle policy manager 206 analyses one or more parameters including, but not limited to, type of electric vehicle cluster, and electric vehicle charging load in a particular electric vehicle cluster for a particular time duration. Based on an analysis of the above-mentioned parameters, the electric vehicle policy manager 206 enforces the electric vehicle load threshold based electric vehicle charging policy (Pd).

In an embodiment of the present invention, the electric vehicle policy manager 206 enforces the policies (e.g. Pt, Pd, Pl) by sending electric vehicle charging policy data to the electric vehicle cluster manager 204. The electric vehicle cluster manager 204 further sends the electric vehicle charging policy data to the one or more smart meters using the corresponding electric vehicle clusters, via the AMI head-end unit 106 (FIG. 1). The AMI Head-end unit 106 (FIG. 1) is configured to set charging profiles of the one or more smart meters in the one or more electric vehicle clusters based on the electric vehicle charging policy data. Based on the charging profile, the one or more smart meters are programmed to generate meter data which is relevant to the set of policies (e.g. Pt, Pd, Pl). In another embodiment of the present invention, the electric vehicle policy manager 206 may send a request data to the AMI head-end unit 106 (FIG. 1) via the electric vehicle cluster manager 204 to remove enforced charging profile in the one or more smart meters.

In another embodiment of the present invention, the electric vehicle policy manager 206 is further configured to assign a priority level to each of the policies (e.g. Pt, Pd and Pl). In the event, the electric vehicle policy manager 206 is required to enforce each of the policies (e.g. Pt, Pd and Pl) in a particular electric vehicle cluster, the policies are enforced as per their priority level. In another embodiment of the present invention, the electric vehicle policy manager 206 is configured to validate each of the policies (Pt, Pd and Pl) such that none of the policies contradict each other with respect to allowing or denying charging of electric vehicles. The electric vehicle policy manager 206 is in communication with the processor 214 which executes a set of program instructions, stored in the memory 216, to execute the functionalities of the electric vehicle policy manager 206.

In various embodiments of the present invention, the electric vehicle policy manager 206 is configured to communicate with electric vehicle policy monitor 208 to manage implementation of electric vehicle charging policies in response to electric vehicle charging events.

The electric vehicle policy monitor 208 is configured to monitor electric vehicle charging events in one or more electric vehicle clusters of the electric vehicle cluster unit 102 (FIG. 1) at predefined time intervals. In an exemplary embodiment of the present invention, the electric vehicle policy monitor 208 monitors the one or more electric vehicle clusters (i.e. 102 of FIG. 1) during peak load time to identify electric vehicle charging events. The electric vehicle policy monitor 208 then sends status read request data to the AMI head-end unit 106 (FIG. 1) via the electric vehicle cluster manager 204 to obtain meter data generated by the one or more smart meters of the one or more electric vehicle clusters, which are identified to having an electric vehicle charging event. In an exemplary embodiment of the present invention, the meter data includes time-stamped load data and electricity consumption data which is generated based on the set charging profile.

In an exemplary embodiment of the present invention, the meter data is received by the AMI head-end unit 106 (FIG. 1) in the form of an electronic file. In another exemplary embodiment of the present invention, the meter data is received by the AMI head-end unit 106 (FIG. 1) in the form of a web-service data packet. The electric vehicle cluster manager 204 collects the meter data from the AMI head-end unit 106 (FIG. 1) and stores the collected meter data in the data repository 210. In an embodiment of the present invention, the electric vehicle policy monitor 208 retrieves the meter data pertaining to respective smart meters from the data repository 210. In another embodiment of the present invention, the electric vehicle policy monitor 208 directly retrieves the meter data from the electric vehicle cluster manager 204 and applies the one or more policies (e.g. Pt, Pd and Pl) enforced by the electric vehicle policy manager 204 on the meter data to obtain output data. The one or more enforced policies are applied to check if the meter data is in accordance with the configured policies (i.e. if the configured policies are violated or followed).

The electric vehicle policy monitor 208 then sends the output data to the rule engine 212. The rule engine 212 processes the output data to evaluate policy violations and generate policy violation action data based on one or more predetermined rules. In an embodiment of the present invention, the one or more predetermined rules and policy violation action data are configured by the user. The one or more predetermined rules may include rules that are defined for each policy type (e.g. Pt, Pd and Pl). In an exemplary embodiment of the present invention, the one or more predetermined rules may include checking if the load is greater than a load threshold. The rule engine 212 generates policy violation action "apply surcharge" in the event the load is greater than the load threshold. In another exemplary embodiment of the present invention, the one or more predetermined rules may include checking if the load is greater than the load threshold+'N' Kilo watts. The rule engine 212 generates policy violation action "apply high rate" in the event the load is greater than the load threshold+'N' Kilo watts. In another exemplary embodiment of the present invention, the one or more predetermined rules may include checking if the load is greater than the load threshold+'M' Kilo watts. The rule engine 210 generates policy violation action such as "switch off electric vehicle charger" in the event the load is greater than the load threshold+'M' Kilo watts. In yet another exemplary embodiment of the present invention, the rule engine 212 generates policy violation actions such as "inform owner of the electric vehicle", "apply high time of use rates", "disconnect electric vehicle charger" based on one or more predetermined rules in the event a policy violation is detected. The rule engine 212 is in communication with the processor 214 which executes a set of program instructions, stored in the memory 216, to execute the functionalities of the rule engine 212.

The electric vehicle policy monitor 208 retrieves the policy violation action data from the rule engine 212 and sends the policy violation action data to the AMI head-end unit 106 (FIG. 1) via the electric vehicle cluster manager 204. The AMI head-end unit 106 (FIG. 1) in turn sends the policy violation action data to the one or more smart meters which are detected as violating the one or more policies. The one or more smart meters or the electric vehicle owners implement the policy violation actions in response to the policy violation action data. In an embodiment of the present invention, the electric vehicle charging may be allowed in a controlled fashion based on the policy violation action. In another embodiment of the present invention, the electric vehicle charging may be stopped based on the policy violation action. The electric vehicle policy monitor 208 is in communication with the processor 214 which executes a set of program instructions, stored in the memory 216, to execute the functionalities thereof.

The electric vehicle policy manager 206 is configured to record the activities of the electric vehicle policy monitor 208 when it monitors the electric vehicle charging events. Further, the electric vehicle policy manager 206 is configured to create an audit log based on the activities of the electric vehicle policy monitor 208 for future reference.

Figure 3:
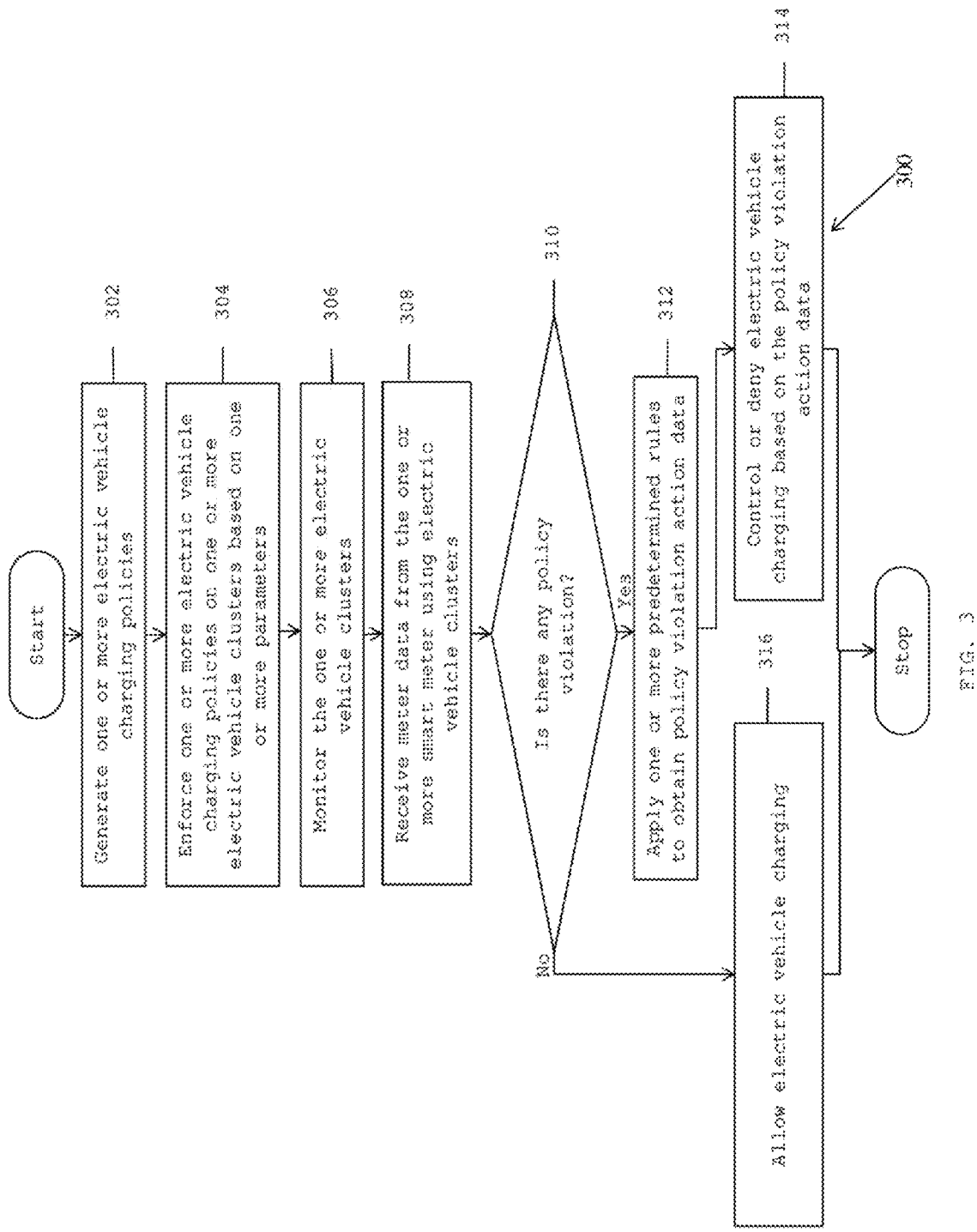
FIG. 3 is a flowchart of a method for managing and controlling electric vehicle charging events, in accordance with an embodiment of the present invention.

FIG. 3 is a flowchart of a method for managing and controlling electric vehicle charging, in accordance with an embodiment of the present invention.

At step 302, one or more electric vehicle charging policies are generated. In an embodiment of the present invention, the electric vehicle charging policies are a set of conditions which are defined for preventing uncontrolled electric vehicle charging events in a particular geographic area. The one or more electric vehicle charging policies are generated and configured based on electric vehicle policy configuration data which is retrieved from a data repository. The electric vehicle policy configuration data is obtained from cluster data, substation data and user provisioned data which are stored in the data repository. In an exemplary embodiment of the present invention, the electric vehicle cluster data includes, but are not limited to, cluster name (for example—electric vehicle cluster-1), cluster type (for example—residential, commercial or industrial), and number of electric vehicle charging stations. In another exemplary embodiment of the present invention, the substation data includes off-peak load conditions, on-peak load conditions, predefined power control conditions for allowing or denying electric vehicle charging and load based threshold data that are obtained from an electric utility for particular days, time and geographic area. In an exemplary embodiment of the present invention, the policy configuration data may include, but are not limited to, electric utility projected off-peak or on-peak load condition for particular calendar days and time, electric utility projected off-peak or on-peak load condition for a particular distribution circuit area, electric utility projected conditions for allowing or denying electric vehicle charging, and a load threshold data which is obtained based on electric utility projected total aggregated electric vehicle charging load at a particular time for a particular distribution circuit area.

In an exemplary embodiment of the present invention, the electric vehicle charging policies include timestamp based electric vehicle charging policy (Pt). The timestamp based electric vehicle charging policy (Pt) is configured using policy configuration data based on electric utility projected off-peak or on-peak load condition for particular calendar days and time. In another exemplary embodiment of the present invention, the electric vehicle charging policies include geographic location based electric vehicle charging policy (Pl). The geographic location based electric vehicle charging policy (Pl) is configured using policy configuration data based on electric utility defined load-control conditions (such as off-peak or on-peak load control condition) for a particular distribution circuit area and for given calendar day and timezone. In yet another exemplary embodiment of the present invention, the electric vehicle charging policies include electric vehicle load threshold based electric vehicle charging policy (Pd). The electric vehicle load threshold based electric vehicle charging policy (Pd) is configured based on electric utility projected load threshold data.

In an embodiment of the present invention, the one or more electric vehicle charging policies Pt, Pd and Pl are configured using the configuration attributes including, but not limited to, policy name (for example, policy 1), policy type (for example, pt, pd or pl), policy category (for example, commercial or residential or industrial), electric vehicle cluster (for example, electric vehicle cluster 1 or electric vehicle cluster 2), substation substation 1 or substation 2), policy start time, policy end time, electric vehicle charger level (for example, level 1 or level 2), and electric vehicle charging load threshold (LT).

At step 304, the one or more electric vehicle charging policies are enforced on one or more electric vehicle clusters based on one or more parameters. In an exemplary embodiment of the present invention, the one or more parameters may include, but are not limited to, type of electric vehicle cluster, type of electric vehicle charger, calendar day and time zone related to the electric vehicle charging event. In an embodiment of the present invention, the one or more electric vehicle charging policies are enforced by sending electric vehicle charging policy data to the one or more electric vehicle clusters. Based on the electric vehicle charging policy data, charging profiles of the one or more smart meters in the one or more electric vehicle clusters are set.

For example, timestamp based electric vehicle charging policy Pt is enforced for cluster C1 for day D1 during time T1c to allow commercial electric vehicle charging. Further, electric vehicle load threshold based charging policy Pd is enforced for cluster C1 for day D1 during time T2 with electric vehicle charging load-threshold of L kilo watts to allow commercial electric vehicle charging. Furthermore, geographic location based electric vehicle charging policy Pl is enforced for cluster C1 for day D1 during time T3 to deny residential electric vehicle charging.

where
$T1c=\{t1c(1), t1c(2), t1c(3), \ldots, t1c(i)\}$
$T2=\{t2(1), t2(2), t2(3), \ldots, t2(j)\}$
$T3=\{t3(1), t3(2), t3(3), \ldots, t3(k)\}$
$C1=\{evcst1, evcst2, evcst3, evcst4, evcst5, evcst6, evcst7, \ldots evcstN\}$ [evcst-electric vehicle charging station]
$T1c$, $T2$ and $T3$ are distinct and no single timeslot of $T1c$, $T2$ and $T3$ is common.

At step 306, one or more electric vehicle clusters are monitored for a predefined time interval. In an embodiment of the present invention, the one or more electric vehicle clusters are monitored to detect any electric vehicle charging event. Status read requests are sent to the one or more smart meters via the corresponding electric vehicle clusters for obtaining meter data or any other status information of the one or more smart meters.

For example, status read requests are sent at midnight of day D1 for the next twenty four hours. The status read requests are sent at predefined intervals (i.e. from time t2 (1) till t2j)) across all the charging stations (i.e. evcst1 to evcstn) of electric vehicle cluster C1.

At step 308, meter data is received from the one or more electric vehicle clusters. In an embodiment of the present invention, the meter data corresponding to one or more smart meters of the electric vehicle clusters include, but not limited to, load data and electricity consumption data.

For example, the meter data obtained from cluster C1 is load data. The load data is aggregated to obtain a total load data (Lt Kilo Watts) using known aggregation methods.

At step 310, a check is performed to determine any policy violation based on the meter data. In an embodiment of the present invention, it is checked if one or more of the policies Pt, Pd and Pl are followed by the one or more smart meters on the basis of information obtained from the meter data.

For example, it is checked if the electric vehicle charging based load threshold policy is met based on the aggregated load data (i.e. Lt Kilo watts) obtained from the meter data.

At step 312, one or more predetermined rules are applied to obtain policy violation action data if policy violation is detected at step 310. In an embodiment of the present invention, the one or more predetermined rules may include rules that are defined for each policy type (i.e. Pt, Pd and Pl).

In another exemplary embodiment of the present invention, the one or more predetermined rules may include checking if the load is greater than the load threshold+'N' Kilo watts. The policy violation action data "apply high rate" is generated in the event the load is greater than the load threshold+'N' Kilo watts. In another exemplary embodiment of the present invention, the one or more predetermined rules may include checking if the load is greater than the load threshold+'M' Kilo watts. The policy violation action data "switch off electric vehicle charger" is generated in the event the load is greater than the load threshold+'M' Kilo watts. In yet another exemplary embodiment of the present invention, the policy violation action data such as "inform owner of the electric vehicle", "apply high time of use", "disconnect electric vehicle charger" may be generated in the event it is determined that the load is greater than the load threshold or any other policy violation is detected.

For example, if the aggregated load (Lt kilo Watts) is determined to be greater than the electric vehicle charging load threshold LT kilo watts, then policy violation action "disconnect electric vehicle charger" is generated.

At step 314, the electric vehicle charging event is controlled or denied based on the policy violation action data. In an embodiment of the present invention, the policy violation action data is sent to the one or more smart meters via corresponding one or more electric vehicle clusters. The electric charging event is controlled or denied based on the policy violation action data.

At step 316, electric charging is allowed if no policy violation is determined at step 310. In an embodiment of the present invention, request is sent to the one or more smart meters via the corresponding electric vehicle clusters to allow electric vehicle charging in the event no policy violation is detected.

Figure 4:
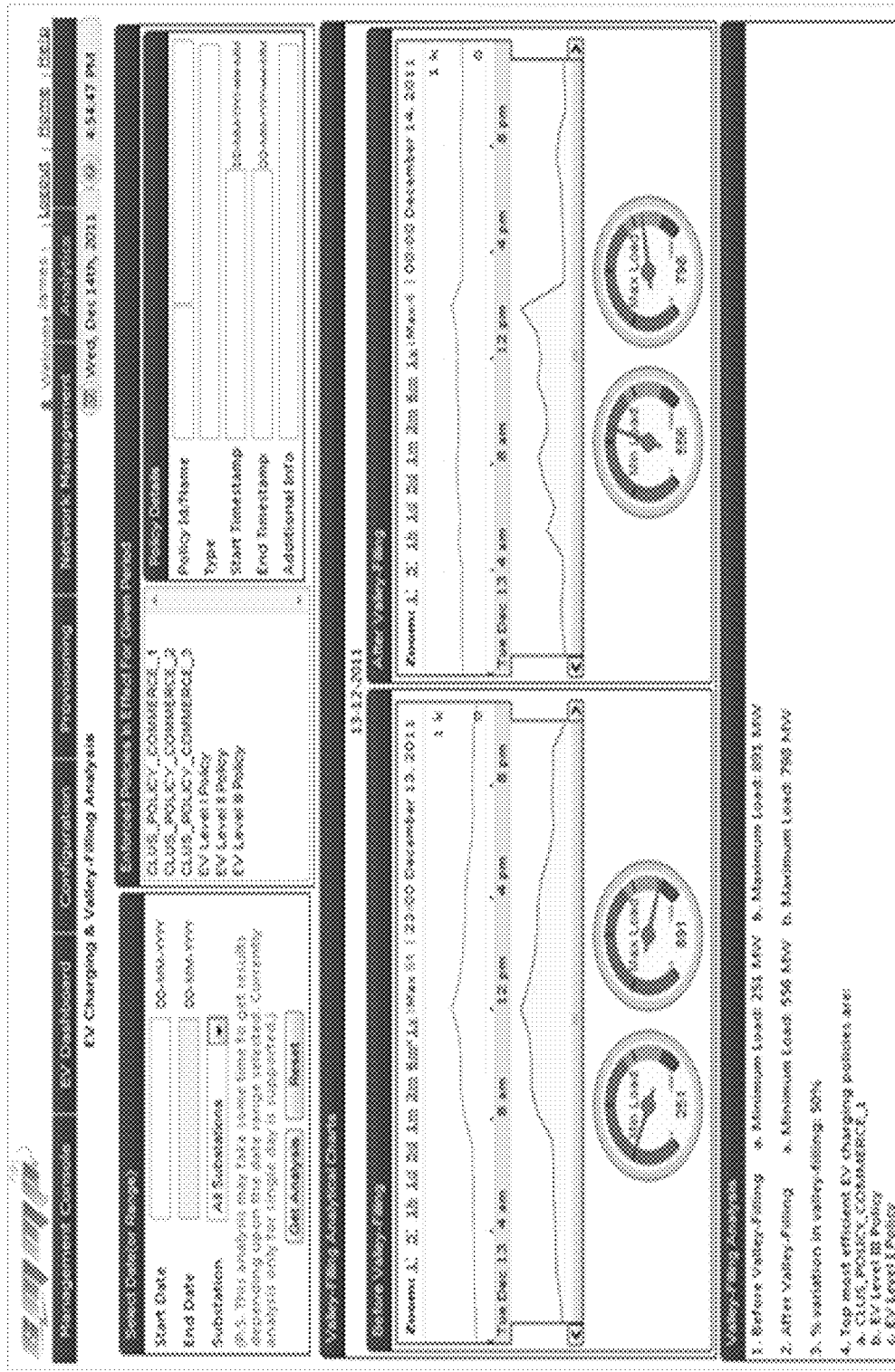
FIG. 4 is an exemplary screenshot depicting impact in load valley filling and in turn on power grid stability as a result of electric vehicle charging for a specific electric vehicle cluster of a specific distribution circuit area, in accordance with an embodiment of the present invention.

FIG. 4 is an exemplary screenshot depicting impact in load valley filling and in turn on power grid stability as a result of electric vehicle charging for a specific electric vehicle cluster of a specific distribution circuit area, in accordance with various embodiments of the present invention. Load valley filling is an electricity load balancing technique which refers to higher utilization of available power capacity at night time when demand is generally low. FIG. 4 shows an increase in minimum load value and a decrease in maximum load value as a result of electric vehicle charging in accordance with an exemplary embodiment of the present invention. As shown in the figure, reference percentage variation of 50% has been observed at night time because of decrease in charging load which is minimum.

Figure 5A:
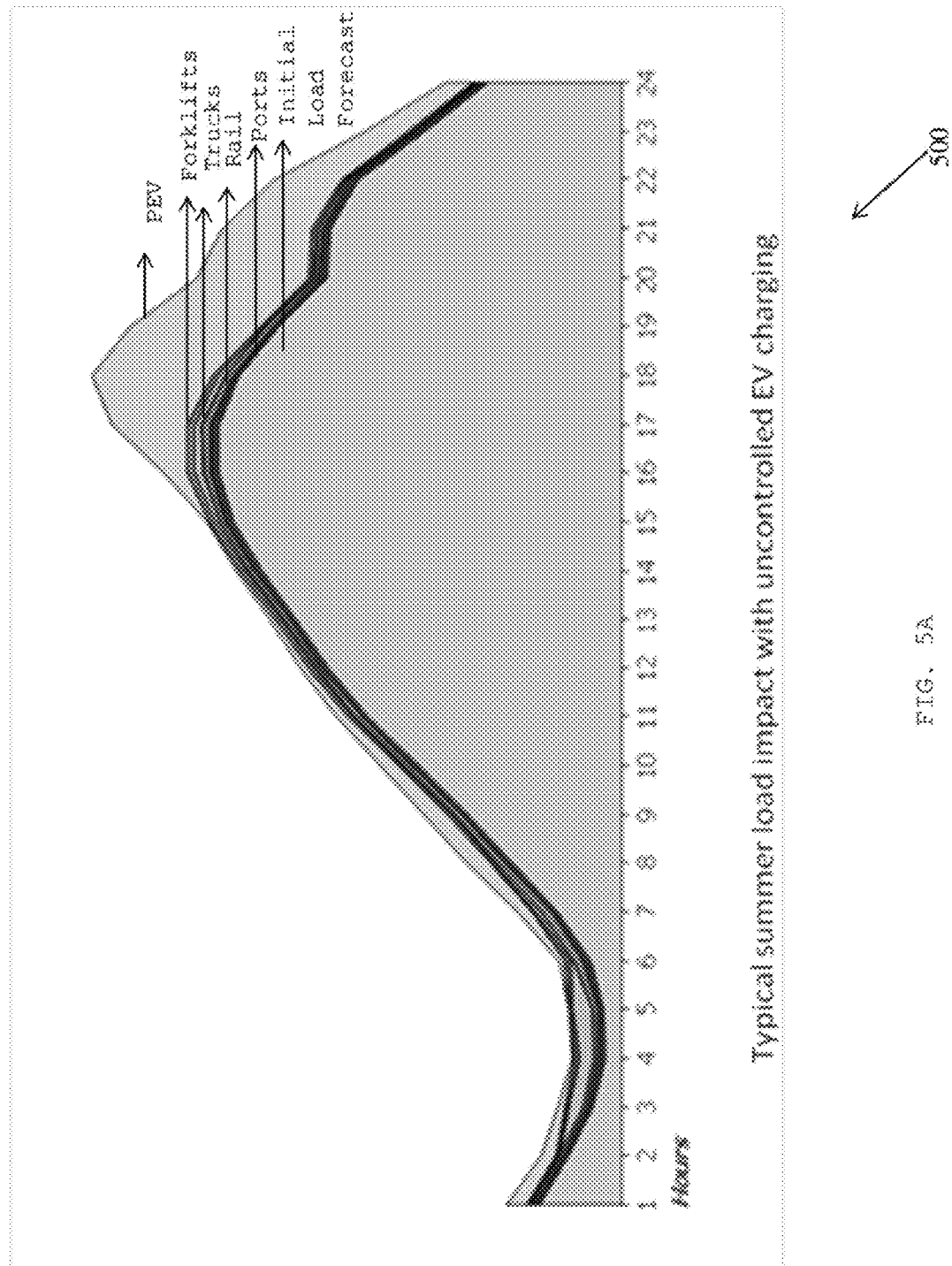
FIG. 5A is an exemplary screenshot depicting load impact without enforcing policies for charging various electric vehicles.

FIG. 5A is an exemplary screenshot depicting load impact without enforcing policies for charging various electric vehicles.

Figure 5B:
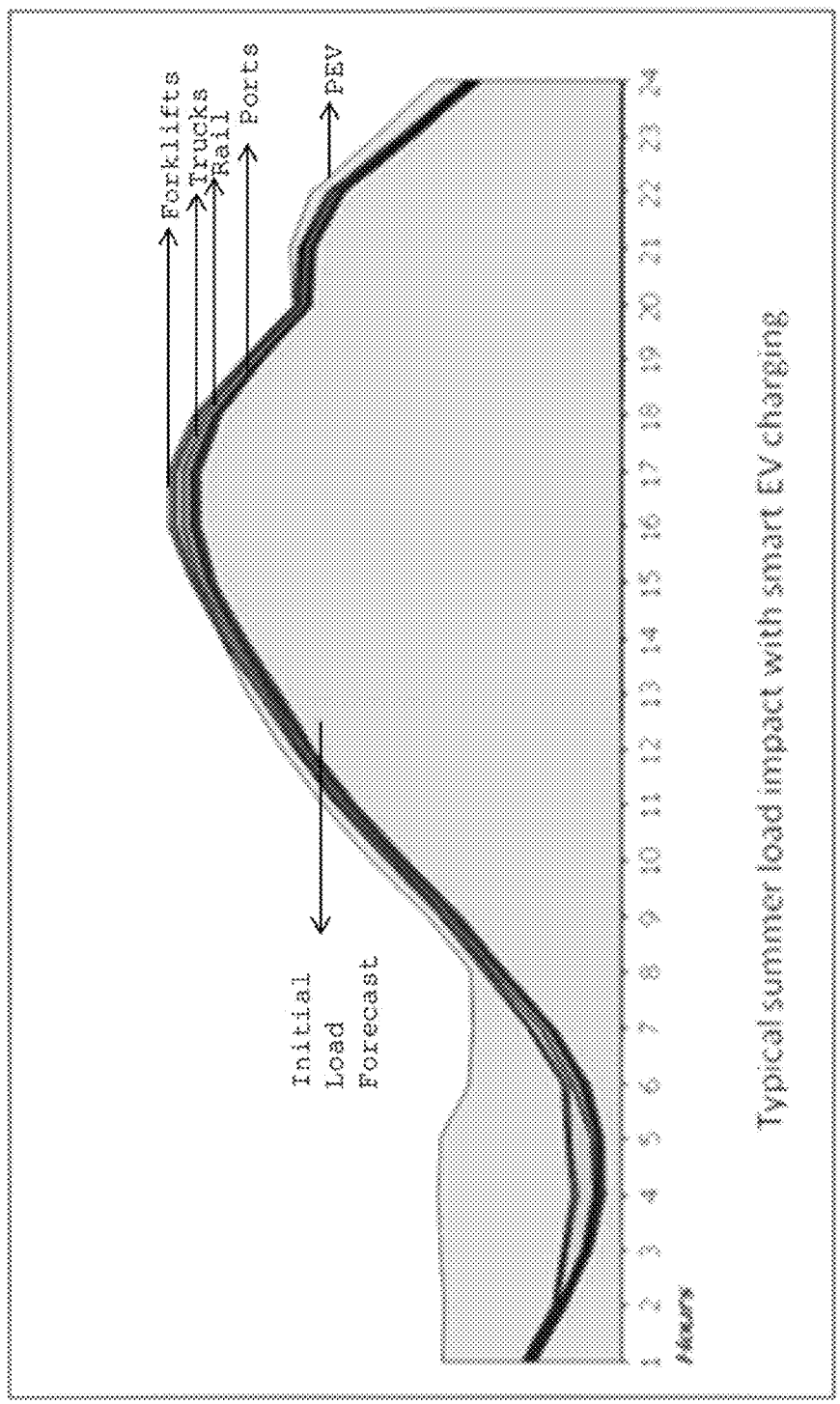
FIG. 5B is an exemplary screenshot depicting load impact after enforcing policies for charging various electric vehicles, in accordance with an embodiment of the present invention.

FIG. 5B is an exemplary screenshot depicting load impact after enforcing policies for charging various electric vehicles, in accordance with an embodiment of the present invention.

Figure 6A:
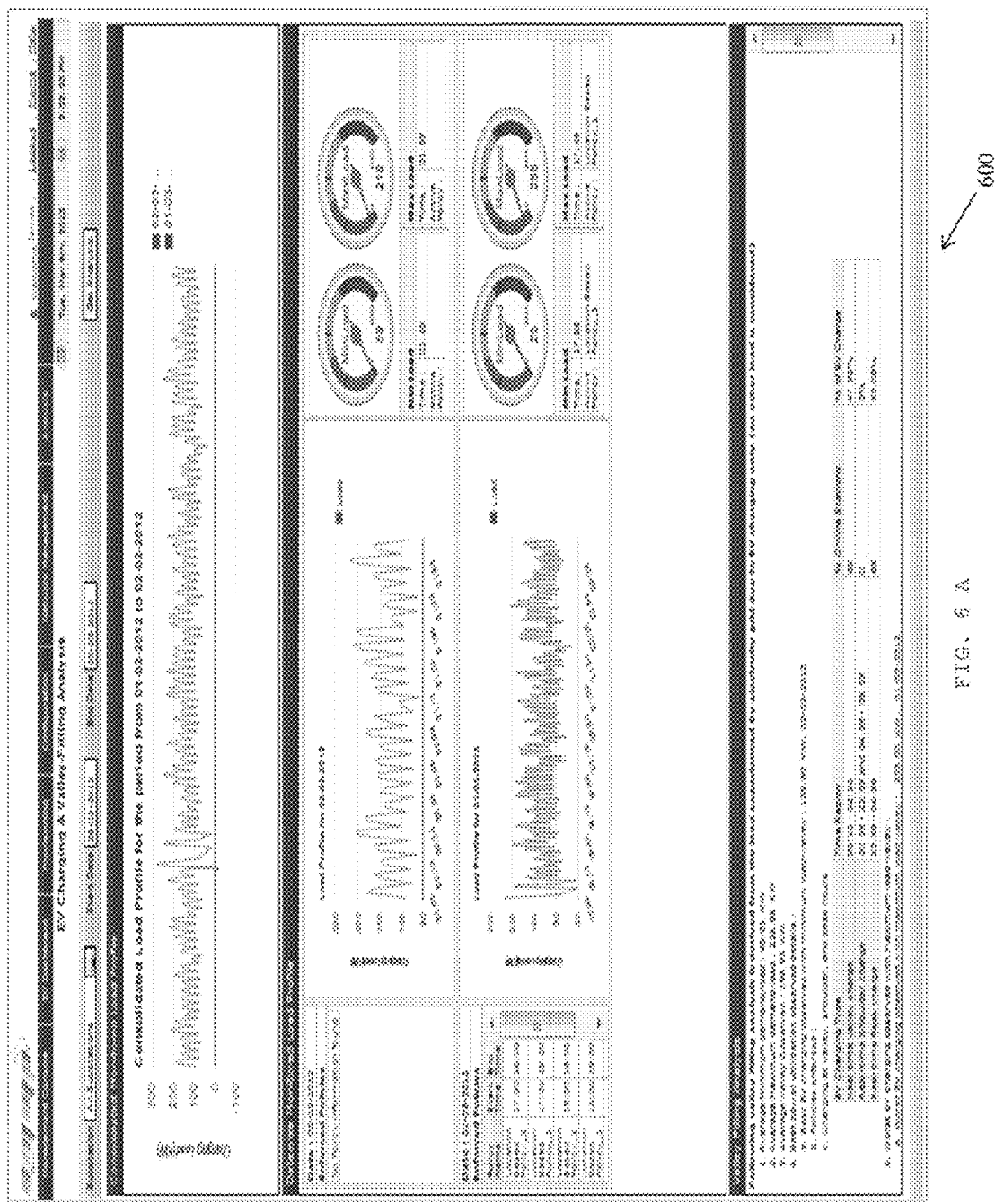
FIGS. 6A and 6B are exemplary screenshots depicting load impact as a result of electric vehicle charging for a specific electric vehicle cluster of a specific distribution circuit area.
Figure 6:
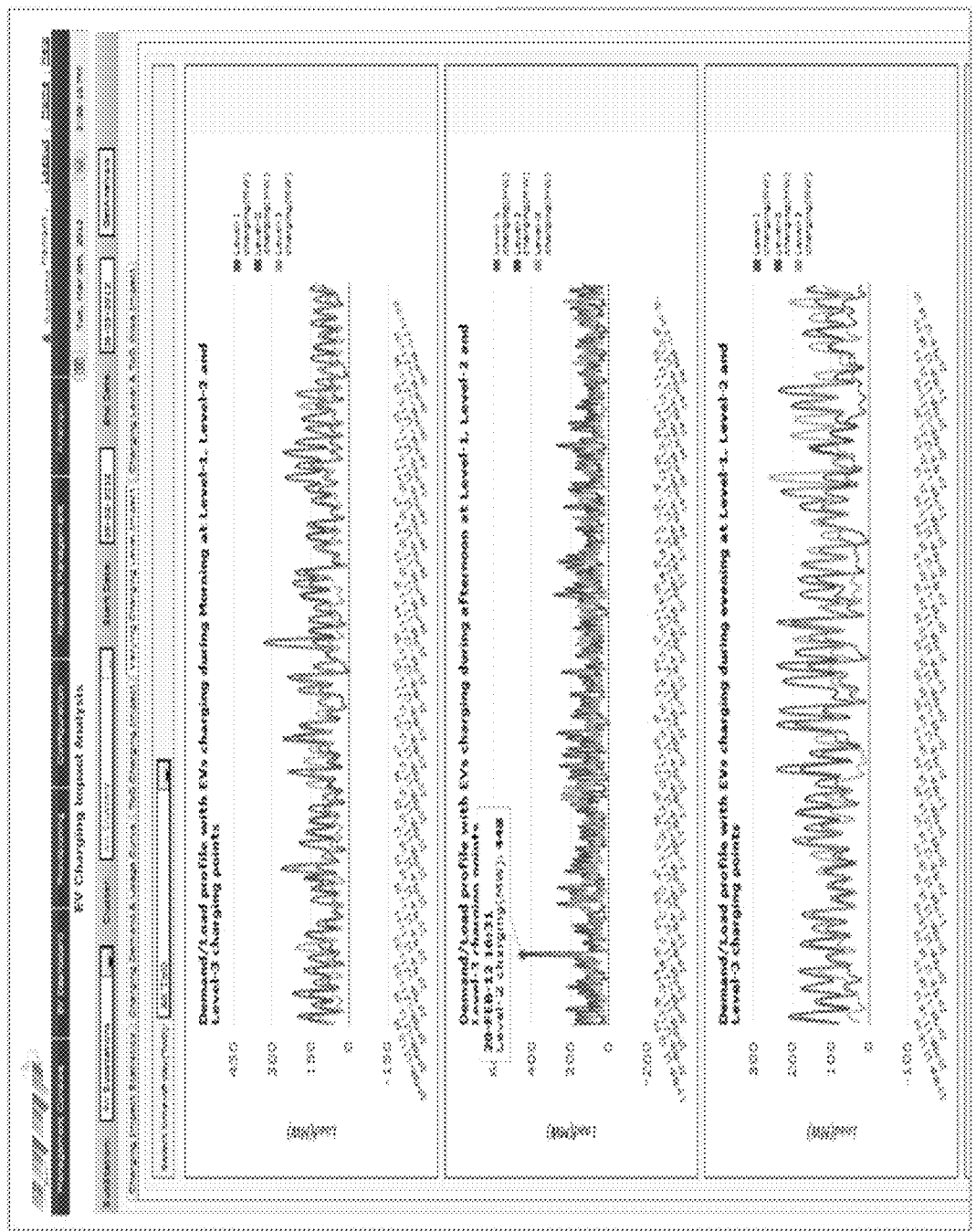

FIGS. 6A and 6B are exemplary screenshots depicting load impact as a result of electric vehicle charging for a specific electric vehicle cluster of a specific distribution circuit area.

FIG. 7 illustrates an exemplary computer system in which various embodiments of the present invention may be implemented.

The computer system 702 comprises a processor 704 and a memory 706. The processor 704 executes program instructions and may be a real processor. The processor 704 may also be a virtual processor. The computer system 702 is not intended to suggest any limitation as to scope of use or functionality of described embodiments. For example, the computer system 702 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 706 may store software for implementing various embodiments of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702, and manages different functionalities of the components of the computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 710 may include, but not limited to, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not limited to, a user interface on CRT or LCD, printer, speaker, CD/DVD writer, or any other device that provides output from the computer system 702.

The storage 714 may include, but not limited to, magnetic disks, magnetic tapes, CD-ROMs, CD-RWs, DVDs, flash drives or any other medium which can be used to store information and can be accessed by the computer system 702. In various embodiments of the present invention, the storage 714 contains program instructions for implementing the described embodiments.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A system for managing and controlling charging of electric vehicles via one or more charging stations over an advanced metering infrastructure, wherein one or more smart meters are associated with the one or more charging stations, the system comprising:
   an electric vehicle cluster unit in communication with a processor and configured to create one or more electric vehicle clusters, the one or more electric vehicle clusters being logical representations of at least the one or more charging stations in one or more distribution circuit areas, and the electric vehicle cluster unit creates the one or more electric vehicle clusters based on predetermined geo-location information, wherein the electric vehicle cluster unit is updated with real-time information of one or more electric vehicle charging events;
   a smart meter management unit in communication with the processor and configured to:
      generate one or more policies based on data, the data being obtained by using the one or more electric vehicle clusters;
      configure the one or more smart meters to generate meter data based on the generated one or more policies;
      analyze the meter data in response to the one or more electric vehicle charging events associated with the one or more smart meters;
      identify if the meter data complies or violates the generated one or more policies;
      generate one or more policy violation action data by applying one or more predetermined rules if it is determined that one or more policies of the generated one or more policies are violated; and
      send the policy violation action data to the one or more smart meters via the associated one or more electric vehicle clusters for controlling electric vehicle charging.

2. The system of claim 1, wherein the one or more electric vehicle clusters are polygon shaped clusters, the vertices of the polygon shaped clusters representing actual geographical latitude and longitude of predetermined locations.

3. The system of claim 1, wherein the smart meter management unit comprises an electric vehicle cluster manager in communication with the processor and configured to obtain at least one of: cluster data and substation data from the one or more electric vehicle clusters, wherein the cluster data comprises one or more attributes of the one or more electric vehicle clusters, and further wherein the substation data comprises electric utility projected load data based on at least one of: time, day and area related to an electric vehicle charging event.

4. The system of claim 3, wherein the smart meter management unit comprises an electric vehicle policy manager in communication with the processor and configured to: generate the one or more policies for controlling electric vehicle charging based on policy configuration data obtained from at least one of: the cluster data, the substation data and user provisioned data; and enforce the generated one or more policies on the one or more smart meters using the one or more electric vehicle clusters, wherein the one or more policies are enforced by defining charging profiles of the one or more smart meters based on the one or more policies.

5. The system of claim 4, wherein the smart meter management unit comprises an electric vehicle policy monitor in communication with the processor and configured to send status read requests to the one or more smart meters using the one or more electric vehicle clusters at predefined time intervals for obtaining the meter data and ascertaining any policy violation.

6. The system of claim 1, wherein the smart meter management unit comprises a rule engine in communication with the processor and configured to generate the policy violation action data by applying the one or more predetermined rules if it is determined that the one or more policies are violated.

7. The system of claim 4, wherein the smart meter management unit comprises a data repository for storing the cluster data, the substation data, the user provisioned data, the policy configuration data, the policy violation action data and the meter data.

8. The system of claim 1, wherein the one or more generated policies comprises: timestamp based electric vehicle charging policy, geographic location based electric vehicle charging policy and electric vehicle load threshold based electric vehicle charging policy.

9. The system of claim 3, wherein the cluster data comprises: cluster name, cluster type, number of electric vehicle charging stations, charging load threshold, geographic boundaries of the charging stations and geographic distribution circuit area.

10. The system of claim 3, wherein the substation data comprises: off-peak load conditions, on-peak load conditions, predefined power control conditions for allowing or denying electric vehicle charging, and load based threshold data obtained from an electric utility for particular calendar days, time and geographic area.

11. The system of claim 4, wherein the policy configuration data comprises: electric utility projected off-peak load condition for particular calendar days and time, electric utility projected on-peak load condition for particular calendar days and time, electric utility projected off-peak or on-peak load condition for a particular distribution circuit area, electric utility projected allow or deny conditions for electric vehicle charging and a load threshold data.

12. The system of claim 4, wherein the electric vehicle policy manager further configures the generated one or more policies based on one or more configuration attributes, the one or more configuration attributes being at least one of: policy name, policy type, policy category, electric vehicle cluster, substation, policy start time, policy end time, electric vehicle charger level, electric utility projected allow or deny condition for electric vehicle charging and electric vehicle charging load threshold.

13. A computer-implemented method for managing and controlling charging of electric vehicles via one or more charging stations over an advanced metering infrastructure, wherein one or more smart meters are associated with the one or more charging stations, the method comprising:
   generating, via a processor, one or more policies for controlling electric vehicle charging events, wherein the one or more policies are generated based on data obtained using the one or more electric vehicle clusters, the one or more electric vehicle clusters being logical representations of at least the one or more charging stations in one or more distribution circuit areas, and the electric vehicle cluster unit creates the one or more electric vehicle clusters based on predetermined geo-location information, wherein the electric vehicle cluster unit is updated with real-time information of one or more electric vehicle charging events;
   configuring, via the processor, the one or more smart meters to generate meter data based on the generated policies;

monitoring, via the processor, the one or more electric vehicle clusters for a predefined time interval for identifying uncontrolled electric vehicle charging events;

receiving, via the processor, meter data from the one or more smart meters of the identified one or more electric vehicle clusters;

analyzing, via the processor, the received meter data to determine if the one or more policies are in compliance with the one or more policies or are violated;

generating, via the processor, one or more policy violation action data by applying one or more predetermined rules based on the analysis; and sending, via the processor, the one or more policy violation data to the one or more smart meters using the identified one or more electric vehicle clusters for controlling the electric vehicle charging.

14. The computer-implemented method of claim 13 further comprising enforcing, via the processor, the generated one or more policies on the one or more smart meters using the one or more electric vehicle clusters based on one or more parameters, wherein the one or more policies are enforced by defining charging profiles of the one or more smart meters based on the one or more policies.

15. The computer-implemented method of claim 14, wherein the one or more parameters comprise: type of electric vehicle cluster, type of electric vehicle charger, calendar day and time zone related to the electric vehicle charging event.

16. The computer-implemented method of claim 13, wherein monitoring the one or more electric vehicle clusters for a predefined time interval comprises sending status read requests to the one or more smart meters using the one or more electric vehicle clusters for obtaining the meter data.

17. The computer-implemented method of claim 13, wherein the data obtained from the one or more electric vehicle clusters comprises: cluster data and substation data, the cluster data defining one or more attributes of the one or more electric vehicle clusters, and the substation data defining electric utility projected load data based on at least one of: time, calendar day and geographic area related to an electric vehicle charging event.

18. The computer-implemented method of claim 13, wherein generating the one or more policy violation action data by applying the one or more predetermined rules comprises applying surcharge, notifying owner of electric vehicles, applying high rate upon occurrence of a predefined condition and disconnecting electric vehicle charging upon occurrence of a predefined condition.

19. A computer program product comprising:

a non-transitory computer-readable medium having computer-readable program code stored thereon, the computer-readable program code comprising instructions that, when executed by a processor, cause the processor to:

generate one or more policies for controlling electric vehicle charging events, wherein the one or more policies are generated based on data obtained using the one or more electric vehicle clusters, the one or more electric vehicle clusters being logical representations of at least one or more charging stations in one or more distribution circuit areas, and the electric vehicle cluster unit creates the one or more electric vehicle clusters based on predetermined geo-location information, wherein the electric vehicle cluster unit is updated with real-time information of one or more electric vehicle charging events;

configure the one or more smart meters to generate meter data based on the generated policies;

monitor the one or more electric vehicle clusters for a predefined time interval for identifying uncontrolled electric vehicle charging events;

receive meter data from the one or more smart meters using the identified one or more electric vehicle clusters;

analyze the received meter data to determine if the one or more policies are in compliance with the one or more policies or are violated;

generate one or more policy violation action data by applying one or more predetermined rules based on the analysis; and send the one or more policy violation data to the one or more smart meters via the identified one or more electric vehicle clusters for controlling the electric vehicle charging.

* * * * *